(12) United States Patent
Liu (10) Patent No.: US 8,886,779 B2
(45) Date of Patent: Nov. 11, 2014

(54) PERFORMANCE MODELING FOR SOA SECURITY APPLIANCE

(75) Inventor: Lei Liu, Santa Clara, CA (US)

(73) Assignee: Oracle America, Inc., Redwood Shores, CA (US)

(*) Notice: Subject to any disclaimer, the term of this patent is extended or adjusted under 35 U.S.C. 154(b) by 1941 days.

(21) Appl. No.: 11/875,628

(22) Filed: Oct. 19, 2007

(65) Prior Publication Data

US 2009/0106012 A1    Apr. 23, 2009

(51) Int. Cl.
 *G06F 15/173* (2006.01)

(52) U.S. Cl.
 USPC ............... 709/223; 709/226; 703/13; 700/29

(58) Field of Classification Search
 USPC ........ 709/223–226; 703/2, 13, 21; 700/28–29
 See application file for complete search history.

(56) References Cited

U.S. PATENT DOCUMENTS

| | | | | |
|---|---|---|---|---|
| 5,752,002 | A * | 5/1998 | Naidu et al. ................... | 703/14 |
| 5,754,831 | A * | 5/1998 | Berman ........................ | 709/223 |
| 6,687,881 | B2 * | 2/2004 | Gauthier et al. ................. | 716/2 |
| 6,704,680 | B2 * | 3/2004 | Amick et al. .................. | 702/130 |
| 7,055,052 | B2 * | 5/2006 | Chalasani et al. ................ | 714/4 |
| 7,107,191 | B2 * | 9/2006 | Stewart et al. .................... | 703/1 |
| 7,287,179 | B2 * | 10/2007 | Doyle et al. ....................... | 714/4 |
| 7,506,259 | B1 * | 3/2009 | Narayanaswami et al. ... | 715/734 |
| 7,650,432 | B2 * | 1/2010 | Bosworth et al. ............. | 709/248 |
| 7,734,775 | B2 * | 6/2010 | Barnett et al. ................. | 709/223 |
| 8,024,278 | B2 * | 9/2011 | Tantawi ......................... | 709/224 |
| 8,195,443 | B2 * | 6/2012 | Malloy et al. .................. | 709/223 |
| 8,326,970 | B2 * | 12/2012 | Cherkasova et al. .......... | 709/226 |
| 8,443,073 | B2 * | 5/2013 | Theilmann ..................... | 709/224 |

OTHER PUBLICATIONS

Denning, Peter J. et al., "The Operational Analysis of Queueing Network Models," Computing Surveys, Sep. 1978, 10(3):225-261.

* cited by examiner

*Primary Examiner* — Bharat N Barot
(74) *Attorney, Agent, or Firm* — Osha Liang LLP (57) ABSTRACT

A device, system, and method are directed towards optimizing a security apparatus within a Service-Oriented Architecture (SOA). Performance data is gathered for the SOA. A plurality of queuing performance models are generated based on a plurality of components comprising a user land, a kernel, and a Central Processing Unit (CPU). The generation may be based on an incremental online training based on the gathered data, on a simulation based on the gathered data, on a probability distribution function, on an operational law, or the like. Derivative points are determined based on the plurality of queuing performance models. The derivative points are maximized by tuning at least one parameter of the user land, at least one parameter of the kernel, and/or at least one parameter of the CPU within at least another simulation and/or increment of the online training. The security apparatus is optimized based on the at least one parameters.

19 Claims, 5 Drawing Sheets

PERFORMANCE MODELING FOR SOA SECURITY APPLIANCE

FIELD OF THE INVENTION

The present invention relates generally to optimization of a computing device, and more particularly, but not exclusively to parameter optimization based on simulations and/or incremental online training mechanisms.

BACKGROUND

Security apparatuses are considered to be one of the key elements within a data center Service-Oriented Architecture (SOA) infrastructure due to friendly deployment, testing, and performance. Specifically, preventive/security apparatuses are security devices administrating network delivery based on traffic rules. Traditional packet filtering may be less effective for intrusion prevention. Other than header processing, content inspections are widely performed to authorize content transmissions. Preventive/security apparatuses also provide mission critical web service security. Hence, an SOA apparatus performance assurance is one of the service objectives within a data center.

Within a preventive/security apparatus system life cycle, the properties of a performance measurement hold a partially observable and stochastic task environment due to incomplete environmental data collection, input, and uncertainty of future states. In addition, the performance measurement is a dynamic and sequential task, since a current load can influence performance predictions and consequently impact future sizing and planning.

Moreover, diversified vendor specific architectures and implementations pose a challenge to a finite experimental environment used to model security apparatus performance. Exploratory actions, such as production probing, may be limited by the time frame of the execution and overhead of management traffics. In addition, traditional apparatus benchmark tests require data collections depend upon programming languages, compilers and hardware platforms. A single benchmark result may not predict apparatus service levels. Furthermore, a single benchmarking may not substantiate a bound analysis and hypothesis. With modern components, systems, software and operating systems, it may be even harder to gauge the accuracy of an intuitive model from experts or experience. Also, scientific methods such as simulation models require low-level development of emulation programs and validation against a probabilistic distribution of job or task workloads. However, analytic models are abstracted by less detailed algorithmic operations to generate the output of expected performance measures for a set of workload input parameters. Hence, approximate analytic models are acceptable for capacity analysis and planning for an SOA apparatus deployment.

With regards to performance evaluation, both qualitative and quantitative studies are influential analysis strategies. In the field of qualitative research, a theoretical foundation has been proposed to unify and extend the analytic models of a computer system as a general queuing model. The model is motivated by the abstraction of a computer system as a network of a set of computational resources (service centers), a collection of jobs or tasks (customers), and an interconnection of a network of queues. In addition, the queue sizes of the different classes of customers, utilization of the service centers, response time for customers and throughput of the customers may be the key performance measurable of the derived model.

Such a queue model of these networked systems are referred to as a Queuing Network model. The Queuing Network model may be a qualitative evaluation based on performance aspects through the life cycle of a computer system. However, the mapping between a real system and a Queuing Network model is a non-trivial task since a model should abstract out some complexities and consider essential aspects contributing to a generalized overview of a real system.

Within quantitative studies, one influential research discovered operational laws about quantitative relationships based upon established performance measures of a real system. For example, the Utilization Law defines the relationship between resource utilization and throughput. The Service Demand Law is associated with system throughput and resource utilization. The Forced Flow Law relates a resource throughput with a system throughput. According to Little's Law, resource response time may be associated with resource throughput and the number of customers. According to the Interactive Response Time Law, a system average response time depends upon system throughput. Practical models built upon these operational laws have been applied to routine performance engineering.

Other performance studies proposed that a performance model and workload model should evolve through the life cycle of system development for future performance predictions and estimations. It is with respect to these considerations and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." As used herein, the terms "device input" or "user input" refer to a user input command at a device.

Moreover, as used herein, the term "user land" refers to a plurality of components and configurations of the components, wherein the plurality of components are characterized as an abstract model of a usage of a system by a user.

In one embodiment, an SOA apparatus, including a preventive/security apparatus, may be characterized as a set of shared computational resources configured to serve at least one concurrent request with a finite capacity by executing a set of jobs or tasks required by security processing. Many properties of a real system may be measured in order to understand system resource contention and the nature of the workload of the system. At a high level of abstraction, a characterization can be denoted as $T(n)$. However, there are two problems associated with the above generalized characterization of the performance abstraction. First, it is rare to find a single or static input such as n. Rather, there is a plurality of distributions of inputs into any particular apparatus. Second, it may be too complicated or impossible to define an exact accurate functional abstraction over the implementation for performance measurements. With less precision, an approximation on bound analysis can be claimed as the lower bound of the $O(f(n))$ to represent the worst case of the best performance goal to ensure response time and service demands. Therefore, an asymptotic performance bound analysis can abstract over constant factors and simplify the bottleneck identification for performance improvement with low cost and efficiency. Hence, a modeling and operational analysis may be performed on a preventive/security apparatus's performance assessment. A model may be derived to predict the performance when an aspect of the SOA system and/or apparatus changes.

Briefly, the present invention is directed towards optimizing a security apparatus within a Service-Oriented Architecture (SOA). Performance data is gathered for the SOA. A plurality of queuing performance models are generated based on a plurality of components comprising a user land, a kernel, and a Central Processing Unit (CPU). The generation may be based on an incremental online training based on the gathered data, on a simulation based on the gathered data, on a probability distribution function, on an operational law, or the like. Derivative points are determined based on the plurality of queuing performance models. The derivative points are maximized by tuning at least one parameter of the user land, at least one parameter of the kernel, and/or at least one parameter of the CPU within at least another simulation and/or increment of the online training. The security apparatus is optimized based on the at least one parameters.

Illustrative Operating Environment

Figure 1:
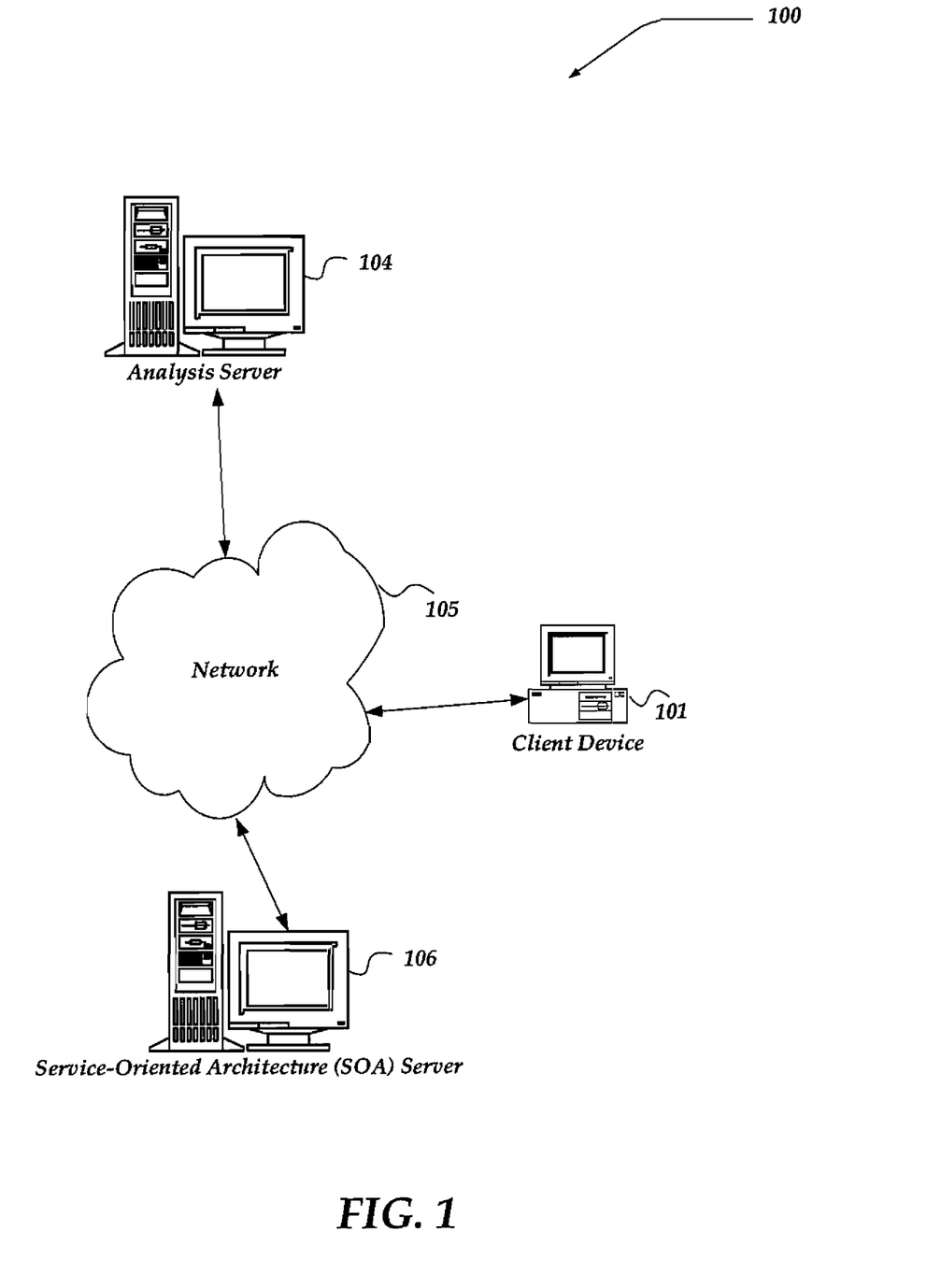
FIG. 1 shows a networked environment illustrating one embodiment of one environment for practicing the invention.

FIG. 1 shows components of one embodiment of an environment in which the invention may be practiced. Not all of the components may be required to practice the invention, and variations in the arrangement and type of the components may be made without departing from the spirit or scope of the invention. As shown, system 100 of FIG. 1 includes network 105 (comprising one or more local area networks ("LANs")/ wide area networks ("WANs"), client device 101, SOA server 106, and analysis server 104.

In one embodiment, SOA server 106 is a preventive/security apparatus. SOA server 106 may be configured to perform a plurality of security operations. In one embodiment, SOA server 106 may be configured to record data about input and/or output from SOA server 106. The data may be used in simulating a model of SOA server 106.

In one embodiment, SOA server 106 may be a SunFire™ T2000 server with 32× 1 Ghz UltraSPARC T1™ processors, 8 GB RAM and 2×68 GB disks, 4× Gigabit Ethernet ports, or the like. In contrast to traditional processor designs which focus on single hardware thread execution, T1 processors provide instruction level parallelism instead of thread level parallelization. T1 processors may have multiple physical instruction execution pipelines and several active thread contexts per pipeline. In addition, improved hardware design with masking memory accessing may reduce memory latency for a processor spending most of its time stalled and waiting for memory. There may be a 12 way associative unified L2 on chip cache. Double Data Rate 2 memory reduces stall. Furthermore, each board has switch chips which may be connected to on-board components.

In one embodiment, the SOA server 106 may deploy CMT and UltraSPARC T1™ technology, firmware and hardware cache design (SunFire, 2005), or any other optimization technology. In one embodiment, the SOA sever 106 may execute a Solaris 10™ operating system. In one embodiment, the Solaris 10™ operating system is configured with optimal tuning parameters from kernel core modules to device drivers. Three key parameters of IP modules may be specified to dispatch the worker threads to different processors (ip_soft_rings_cnt=32, ip_sequence_bound=0, ip_sequence_fanout=1) to execute the interrupt handlers and in order to increase processor utilization and throughput. The critical TCP module tunables (tcp_con_req_max_q, tcp_conn_req_max_q0) and the backlog of the user land process may be set to 8 K to reduce the error rate and improve throughput. In one embodiment, listening backlog and listener threads are configured as optimal values. To avoid network saturation resulting from backlog on a single network card, SOA sever 106 may be configured with four Gigabit Ethernet interfaces using e1000g driver with different ports. A resource management pool may be created for fair sharing scheduling and equal sharing memory usage with network interfaces.

In one embodiment, protocol runnables such as proxy, DNS, connection persistence and piggyback features may be disabled to eliminate the variables contributing to performance overheads. In one embodiment, at least some settings of congestion control and delayed acknowledge may be enabled to ensure OSI layer 3 reliability for data traffics. Moreover, 2 GB memory and 8 KB pagesize may be configured for kernel loading and execution (e.g., kernel characteristics).

In one embodiment, SOA server 106 may be configured to perform a plurality of security operations. Data may be gathered for the performed operations. For example, plain XML forwarding, transformation, encryption and signing may be categorized as each individual test case of security operations for a specific payload size. The payload size of 1 KB, 10 KB and 100 KB XML documents may be separated for each class of customers. The workload intensity may include an arrival rate of λ. λ represents the rate at which transactions arrived to the system. λ may be independent of the apparatus state and the number of customer classes in the tested apparatus. Within the domain context of an SOA, service collaboration and integration may have little to no dependency on user interactions. In one embodiment, think time (e.g., latency of response) of a service request within the above scenario may be disregarded in the data collection to simplify transactions originating from virtual users. Moreover, service demand data may be recorded and/or derived from the system and resource utilization according to the operation laws. In one embodiment, the throughput of the modeled system may be set, maintained, or specified equal to the above arrival rate in equilibrium.

For quantitative analysis, software-monitoring tools may be used to obtain input parameters from measurement data on SOA server 106. For example, Solaris™ kernel statistic gathering tools, process tools, forensic tools and dynamic tracing tools may provide critical workload characterization parameters at the system and device level. In addition to the system data collection, user land transactions and arrival rates may be gathered. Specifically, to quantify the computing resource utilization, data collection intervals may be configured at 3 seconds for a short-term sampling and 60 minutes for historical monitoring. In addition, event based dynamic tracing may be utilized to monitor interrupts, system calls and processor executions. To provide the high-resolution time stamp to measure processor and network events, microstate statistics may be collected.

Figure 2:
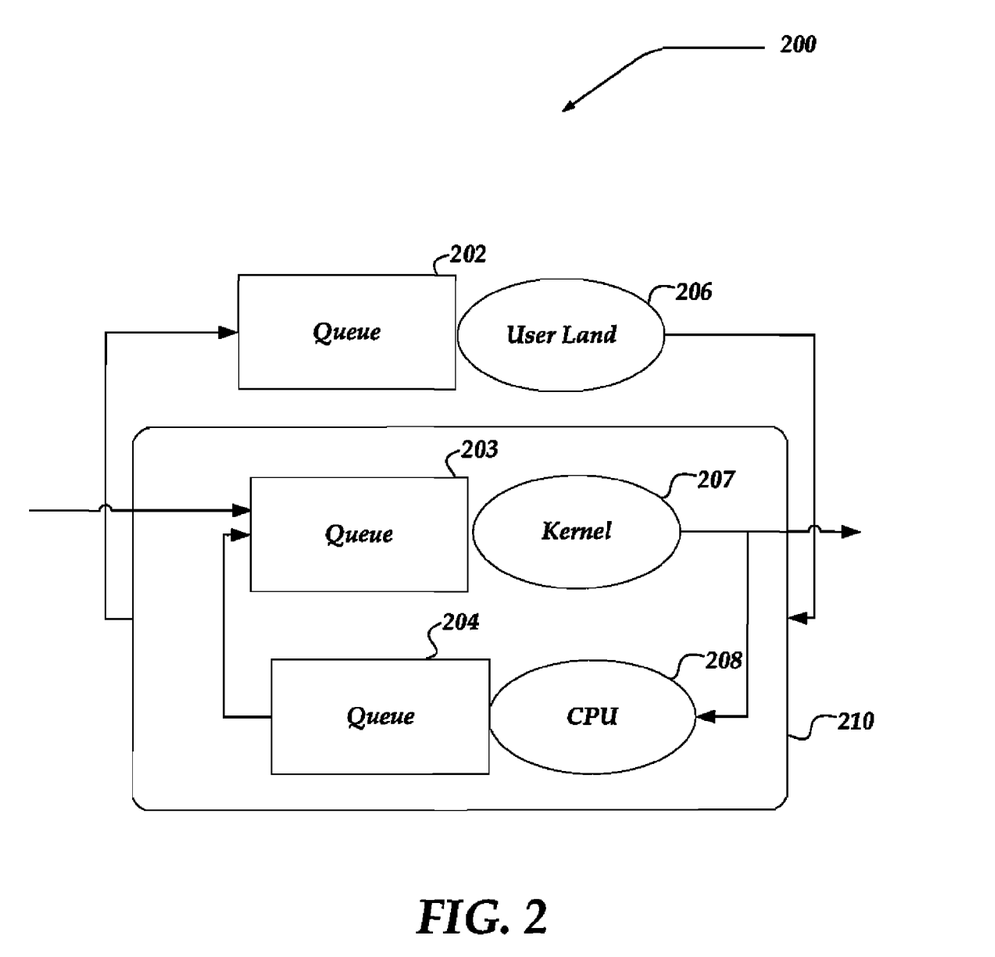
FIG. 2 shows an illustrative Open Class Model used in optimizing an SOA apparatus.

In order to validate the model against SOA server 106, data collection may be restricted to data necessary to obtain input parameters for an open class apparatus model, such as model 200 of FIG. 2. The model may be validated against system 100. Workload intensity and service demands may also be two other input parameters collected. The service demands may be defined based on the Service Demand Law to identify resource utilizations and system throughput. Since system throughput may be equal to workload intensity for an open class system, the data collection may be concentrated on the CPU, kernel and user land resource utilization, which may be collected via standard Solaris™ performance tools. In one embodiment, the measurement thresholds may be bound to a 3% failure rate and/or 30 second response time. In one embodiment, 100 requests may be ramped up every 10 seconds making it beyond the capacity of the load generator.

In one embodiment, SOA server 106 may include at least 120 MB resident physical memory hosting an apparatus specific single user land process for inbound and outbound processing. During a one-hour test cycle, there may be a plurality of Light Weight Processes (LWPs) executing on SOA server 106 to process a (simulated) workload. The percent of time spent for TLB miss processing may be about 5.3%, which may indicate the efficient processor memory accessing. The CPU throughput may be 44 million instructions per second.

Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. In addition, in at least one embodiment, client device 101 may also provide information, such as a MAC address, IP address GPS coordinates, latitude/longitude, IPv6 address, Unique Processor ID (such as on Intel's CPUs), or the like, useable to determine its physical location. In one embodiment, client device 101 may act include a load generator for sending requests (security operation requests) to SOA server 106. On client device 101, a load generator may monitor transactions and the arrival rate of system 100. To verify the proposed open class model, such as the model 200 of FIG. 2, small, medium, and/or large workloads may be simulated. In one embodiment, the number of virtual users on client device 101 may be ramped up to 1000, or more. In one embodiment, the simulated load may be ramped up to 100 requests per 20 seconds, then to a steady state. The simulated load may be sampled and collected.

Network 105 is configured to couple analysis server 104 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, CAT5, CAT5e, Fiber, DSL, Cable Modem, A/C power networks, POTS, Ethernet, T1, Frame Relay, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between analysis server 104, client device 101, and other computing devices. In one embodiment, network 105 may be configured as a Virtual LAN(VLAN). Network 105 may include a Gigabit switch providing point-to-point connection between SOA server 106 (e.g., security/preventive apparatus) and client device 101 (e.g., load generator).

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of analysis server 104 is described in more detail below in conjunction with FIG. 3. Devices that may operate as analysis server 104 include personal computers, desktop computers, multiprocessor systems, microprocessor-based or programmable consumer electronics, network PCs, servers, and the like. Although FIG. 1 illustrates analysis server 104 as a single computing device, the invention is not so limited. For example, one or more functions of analysis server 104 may be distributed across one or more distinct computing devices. In one embodiment, analysis server 104 includes a simulation environment for simulating the operations of a CPU, kernel and/or user land. In one embodiment, data of SOA server 106, client device 101, and/or network 105 may be characterized as a user land. In one embodiment, data of SOA server 106 may characterize a CPU and/or kernel. In one embodiment, analysis server 104 may perform processes 400 and 500 of FIGS. 4-5 to optimize an SOA apparatus.

In one embodiment, for a qualitative analysis of an a performance of an SOA apparatus, analysis server 104 may simulate an augmented Queue Network model for both input and output analytic assessment of SOA server 106, network 105 and/or client device 101. For more precise measurements, a basic operational analysis may be performed to establish performance quantitative relationships. A model based performance methodology may be used to achieve a high degree of adaptation to the changes in a dynamic and stochastic task environment. The unified equilibrium state probabilities may also be augmented. An analytic model of the apparatuses may be used to simplify performance computation and prediction of the SOA. A simulated model may be used for performance calculation and capacity planning of an SOA apparatus. To verify the model qualification and quantification, the simulation may be used for an empirical study.

Illustrative Model

FIG. 2 shows an illustrative Open Class Model used in optimizing an SOA apparatus. While model 200 shows a variety of components and mathematical abstractions, it will be understood that one skilled in the art may implement the simulation of the model within a computing device, such as analysis server 104 of FIG. 1.

The states of the model will now be discussed. The joint equilibrium distribution of queue sizes in a network can be derived. The queues contain N service centers and R classes of customers. The equilibrium state probabilities have a general form with S which is a state of the system.

$P(S)=C*d(S)*f_1(x_1)*f_2(x_2)*f_N(x)$, where, $x_i$ is the configuration of customers at the $i^{th}$ service center, d(S) is a probabilistic distribution function of the state of the model, f is a function that depends on the type of the $i^{th}$ service center, and C is a normalizing constant. It is assumed that the equilibrium probabilities exist and are unique. Specifically, the properties of a state can be quantified below.

All quantities $\in \Re$

K denotes the number of queue within a queuing network

R represents the number of customer classes $N \leftarrow <N_1, \ldots, N_M>$ denotes multiclass customer population $X_{0,r}$ is the throughput of customer class r $U_{i,r}$ is the utilization of a resource i for class r $R_{0,r}$ is the average response time of customer class r $Scal_{n,r}$ is the scalability of customer class r $T_{i,r}$ is the average service time of class r Λ resource i τ denotes the length of time E the observable period $X_{i,r}$ is the throughput of a resource i for customer class r $C_{i,r}$ is the total service completions at resource i for customer class r $C_{0,r}$ is the total number of request completions by the system for customer class r In one embodiment, the arrival rate is the rate at which a transaction comes to the system. The arrival rate may be independent of the state and number of customer classes in the system.

$\lambda \leftarrow <\lambda_1, \ldots, \lambda_r>$ denote the sequential arrival rates, $\lambda_i \in \Re$ The initial state of the model will now be discussed. All above quantities declared are initialized as 0 except the quantities that are assigned to a constant number listed below due to the characterization of a preventive/security apparatus task environment.

K←3

R←4

τ←1 hour

The above measures may be calculated based on another cycle of data collection within an interval T.

In one embodiment, a test of the model 200 may produce a verification of the approximation and may be used to set actual values of a measured real system with model predictions. In practice, the acceptable margin of error is considered to be no more than 10% for resource utilization, 10% for system throughput and 20% for response time, or the like. In one embodiment, the cost of establishing a model for performance measures are the quantity of algorithmic operations to design and develop, input parameters and data collection required for function computation to derive acceptable outputs.

In one embodiment, as a generalized view of a preventive/security apparatus, the detailed implementation and deployment aspects are abstracted. To reduce complexity, a general goal based performance and workload model is developed in order to abstract out at least some of the complexities of a real apparatus while retaining those qualities essential to meet service objectives. In one embodiment, to formulate the model, at least some detailed complications, including infrastructure deployment, contingency plans for reserving and backup of additional environment may be abstracted out of the above state description in order to abstract the problem representation.

In one embodiment, to map the apparatus system into the Queuing Network model, the complexity of an apparatus system can be abstracted as three interconnected queues 202-204 of operating system kernel 207 and underlining CPU 208. The queuing model can be applied to analyze the performance for a workload density for a given transaction arrival rate λ of service data or content traffic communicated between SOA apparatus 210 and user land 206. Mostly, in memory processing and sufficient quantity of RAM configurations on the SOA apparatus 210 can be abstracted to ignore the disk and memory contributions and the potential performance degradation of good-put.

In addition, resource partitioning and isolation of execution environments of $$\sum_{i=0}^{n} \sum_{j=0}^{n} env$$

can de modeled as sharing a single instance of the kernel resource 207. Kernel tunable, kernel built-in resource management module and networking OSI reference implementation provide congestion and administrative controls on the bounds of model computation. Both kernel 207 and CPU 208 of an SOA apparatus may be considered as model elements. For queues 202-204, pipeline scheduling, fair scheduling, priority scheduling, FIFO scheduling and lock primitive implementation are generalized as a generic queue which abstracts the detailed queue implementation such as the direction of the queue for inbound and outbound packets, and number of queues, or the like.

Other than kernel space generalization, user land 206 activities may also be abstracted. Specifically, lightweight processes, software threading model and scheduling implementation are included in the user land 208 model qualification in order to simplify the abstraction.

Model 200 models an open class model in which states are dependent on the rate λ of arrival processes with unbound customer classes. Model 200 may be used to compute the contention, which is the waiting time of a transaction spent on execution of CPU 208's instruction and processing of kernel 207. Contention may be determined by the average service time of the above sources and the load of SOA apparatus 210. The general form of equilibrium state probability distribution function can be augmented as $$P(S)=C^*d(S)^*f_{cpu}(x_{cpu})^*f_{kernel}(x_{kernel})^*f_{userland}(x_{userland})$$

Additionally, real world production preventive/security apparatus deployment reveals that web service packet processing via apparatuses can be categorized into four classes of distinct clusters. The plurality of security operations performed by SOA apparatus 210 may include no processing, transformation, encryption, signature and policy enforcement, or the like.

Illustrative Server Environment

Figure 3:
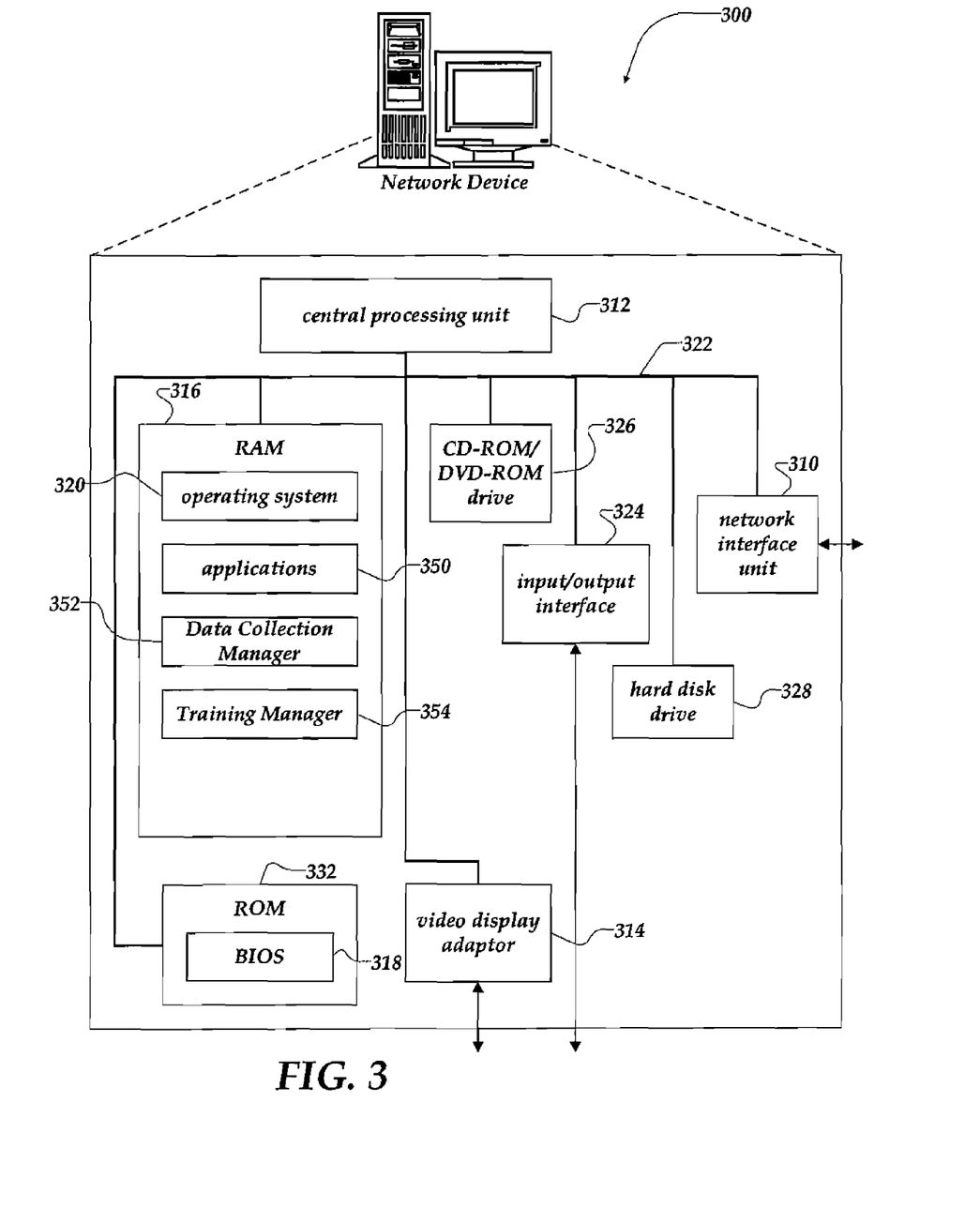
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, analysis server 104 of FIG. 1.

Network device 300 includes central processing unit 312, video display adapter 314, and a mass memory, all in communication with each other via bus 322. The mass memory generally includes RAM 316, ROM 332, and one or more permanent mass storage devices, such as hard disk drive 328, tape drive, CD-ROM/DVD-ROM drive 326, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, Digital Video Disc(DVD) or other optical storage, holographic, nanotube, atomic, biological, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Data collection manager 352 and/or simulation manager 354 may also be included as one or more application programs within applications 350.

Data collection manager 352 may gather performance data, including data about arrival rates, parameters, scheduling, priorities, contention, or the like, from a plurality of apparatuses, including an SOA server, a network, and/or a client device of network interface unit 310. In one embodiment, data collection manager 352 may receive such data from SOA server 106, network 105, and/or client device 101 of FIG. 1. Data collection manager 352 may store the data within hard disk drive 328, RAM 316 or the like.

Simulation manager 354 may implement a simulation of an open class model of an SOA apparatus and/or optimize the configurations and/or operations of the same or a different SOA apparatus based on the simulation. In one embodiment, simulation manager 354 may receive data from data collection manager 352. The collected data may be used to simulate the open class model. In one embodiment, simulation manager may perform processes 400-500 of FIGS. 4-5.

Illustrative Operation

Figure 4:
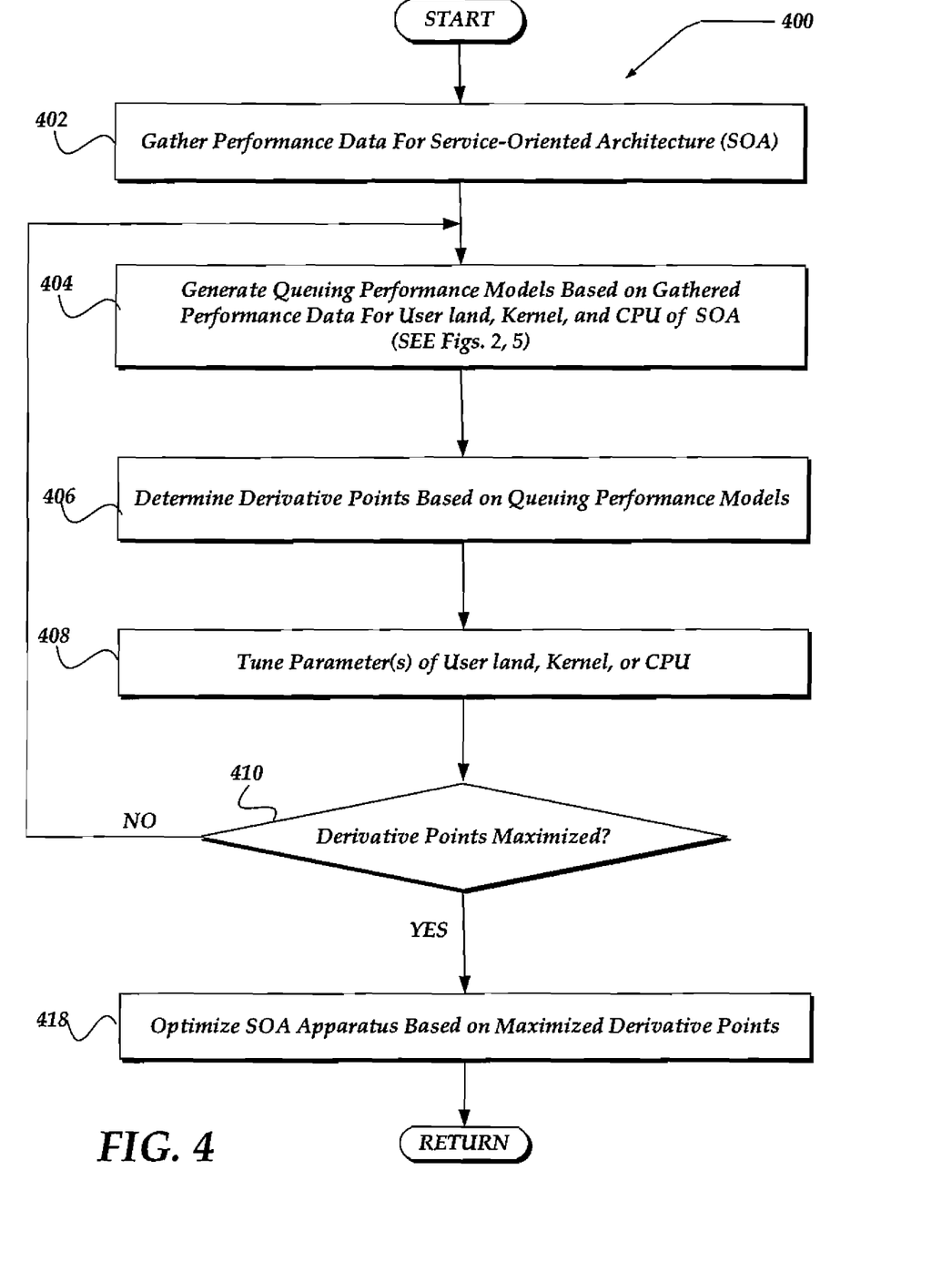
FIGS. 4-5 illustrate logical flow diagrams generally showing embodiments of processes for optimizing an SOA apparatus, in accordance with the present invention.
Figure 5:
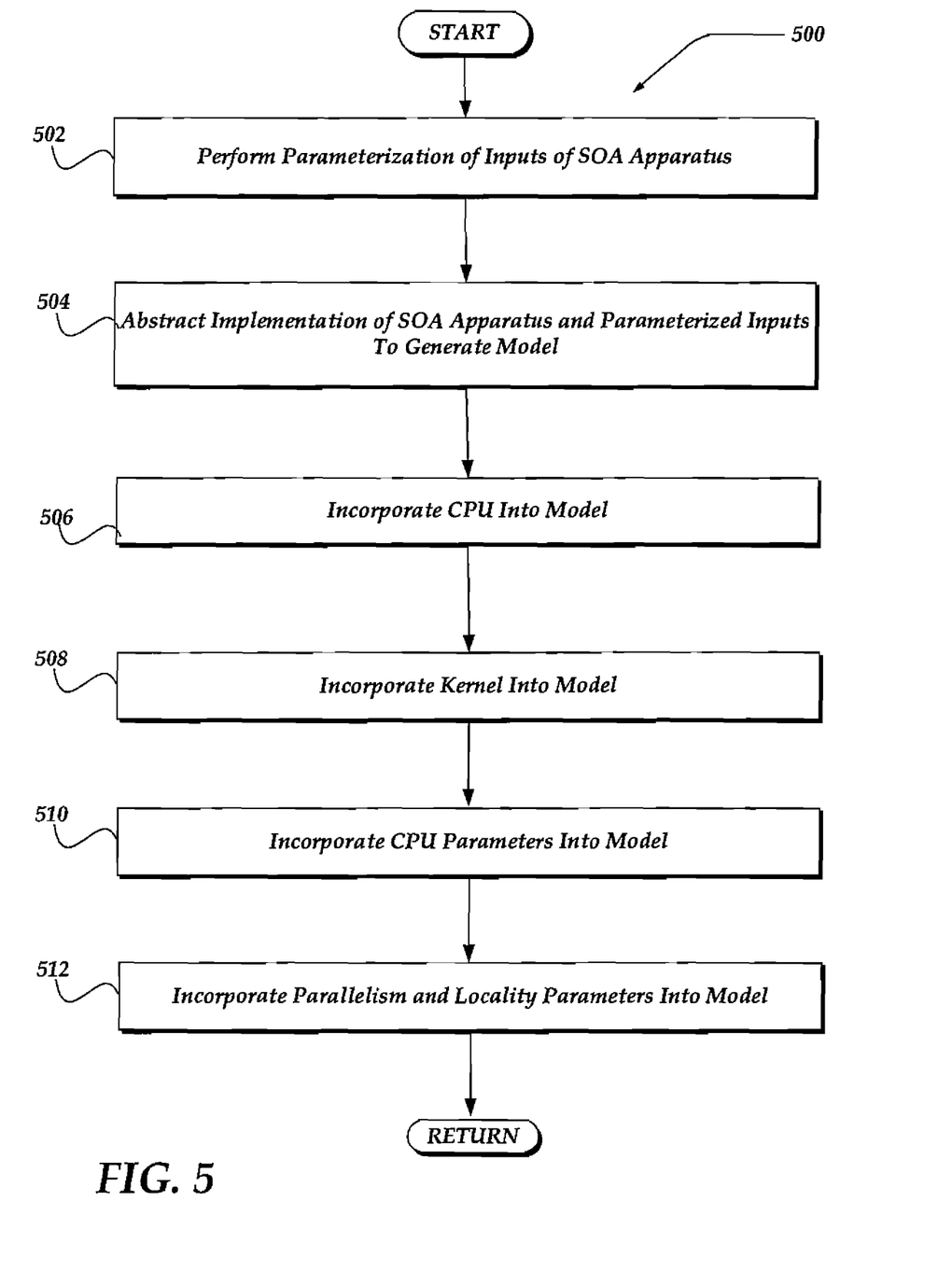

FIGS. 4-5 illustrate logical flow diagrams generally showing embodiments of processes for optimizing an SOA apparatus. The processes shown in FIGS. 4-5 may be implemented with analysis server 104 of FIG. 1.

Process 400 begins, after a start block, at block 402, where performance data is gathered for an SOA apparatus. Performance data may comprise data about arrival rates, parameters, scheduling, priorities, contention, or the like. Processing next continues to block 404.

At block 404, a plurality of queuing performance models (open class models) may be generated based on the gathered data a plurality of components comprising a user land, a kernel, and a Central Processing Unit (CPU) of the SOA performing a plurality of security operations. In one embodiment, the plurality of security operations comprises encrypting, decrypting, forwarding, transformation, signing, or enforcing a policy. In one embodiment, an output of the at least one of the plurality of components is an input to at least another one of the plurality of components, the components may be configured as a recurrent network, or the like.

In one embodiment, the generation may be based on a plurality of operational laws. In one embodiment, the generation may be based on a probability distribution function of the states of the SOA. In one embodiment, the plurality of queuing performance models is based on a Quality of Service (QoS) factor of at least one of the plurality of components. In one embodiment, the generation may be based on the gathered performance data. In one embodiment, the generation may be performed at least in part by process 500 of FIG. 5 and/or modeled by model 200 of FIG. 2.

In one embodiment, generating the plurality of queuing performance models comprises performing an incremental online training of the queuing performance models based on the plurality of components. For example, for each increment of time, data for at least one of the components may be used to perform a queuing model analysis for the component.

In another embodiment, the plurality of components are simulations of physical components of the SOA. In one embodiment, the simulation of the plurality of components is a recurrent network of the plurality of components. In one embodiment, at least one parameter comprises a virtualization of a percentage of usage of a resource by an application. In one embodiment, performing the simulation comprises training a neural network on a training set of inputs and outputs for a component of the SOA.

In one embodiment, performing the simulation comprises simulating for the user land, a plurality of user land parameters comprising a plurality of input packets and a schedule of use of the user land, to generate a plurality of user land operations per time, wherein the user land characterizes a usage by at least one user of the SOA. A user land queuing model analysis is performed on the user land operations per time to generate a user land performance model. Performing the simulation further comprises simulating for a kernel, a plurality of kernel parameters comprising a memory usage, a schedule and policy of use of the kernel, and a CPU allocation, to generate a plurality of kernel operations per time, wherein the kernel characterizes a kernel of the computing environment. A kernel queuing model analysis is performed on the kernel operations per time to generate a kernel performance model. Performing the simulation further comprises simulating for the CPU, a plurality of CPU parameters comprising a an instruction set, an execution request, and an allocated percentage of CPU usage for an application executing on the CPU, to generate a plurality of CPU operations per time, wherein the CPU characterizes a processor of the computing environment. A CPU queuing model analysis may also be performed on the CPU operations per time to generate a CPU performance model. In one embodiment, the operations per time may be a translation of, based on, or a representation of a throughput, response time and scalability, availability, or other Quality of Service (QoS) of a component. Processing then continues to block 404.

At block 404, a plurality of derivative points are determined based on the plurality of queuing performance models. In one embodiment, determining the plurality of derivative points comprises taking a partial derivative of at least one curve of at least one model. In one embodiment, the at least one curve is of two or more dimensions. Processing then continues to block 406.

At block 406, the plurality of derivative points is maximized by tuning at least one parameter of the user land, at least one parameter of the kernel, or at least one parameter of the CPU within at least another increment of the online training of the queuing performance models, another simulation of the user land, the kernel, and/or the CPU, or the like. In one embodiment, tuning at least one parameter comprises performing a dynamic programming operation or an automatic programming operation. In one embodiment, maximizing the plurality of derivative points comprises determining a local maximum for at least one model. Processing then continues to decision block 408.

At decision block 408, it is determined whether the derivative points are maximized. If the derivative points are maximized, processing continues to block 510. For example, if it is determined that the derivative points begins to decrease from a prior iteration/increment of the online trainings and/or simulations performed by blocks 402-408, then it is determined that the derivative points are maximized. It will be understood that other techniques, such as a depth first search, breadth first search, A* search, or the like of derivative space of the plurality of queuing performance models may be performed without departing from the scope of the invention. Otherwise, processing loops back to block 402.

At block 410, a configuration of a security apparatus within the SOA, such as SOA server 106 of FIG. 1, is optimized based on the at least one parameter of the user land, the at least one parameter of the kernel, and the at least one parameter of the CPU associated with the maximized plurality of derivative points. For example, parameters for network usage, CPU usage, selection of instruction sets, or the like, may be configured for the security apparatus.

FIG. 5 shows a logical flow diagram for simulating a plurality of components of an SOA. While process 500 describes a variety of models and mathematical abstractions, it will be understood that one skilled in the art may implement the models or abstractions within a computing device, such as analysis server 104 of FIG. 1.

Process 500 begins, after a start block, at block 502, where a parameterization may be performed to abstract over a plurality of inputs of components of an SOA apparatus in order to identify some parameter or parameters that characterize the size of the input. One skilled in the art will recognize this as a workload characterization for a model analysis. An appropriate specified open class model can be considered as a black box with a set of input and output variables, input parameters such as workload intensity and service demands can be determined by the measurement data which describe the apparatus system and software configurations and the workload of the apparatus. In one embodiment, the outputs are the performance goals of the apparatus model such as throughput, response time and scalability, availability, or the like.

At block 504, abstraction over the implementation of the apparatus and the infrastructure topological deployment may be performed to reflect the performance measurement over the steady state distribution. In one embodiment, the performance measurement is decoupled from the apparatus software design and implementation, and the underlining hardware platform architecture.

In one embodiment, the arrival rate may be the ratio of the total completed requests $N_{success}$ of the class $r \in R$ within the test interval $\tau$. The arrival rate $\lambda_r$ is computed as $\lambda_r \leftarrow N_{success,r}/\tau$. Thus, a basic model may be generated based on the abstraction and the parameterized input. Processing next continues to block 506.

At block 506, the CPU is incorporated into the model. In one embodiment, the total CPU utilization may be the sum of kernel and user land utilization which is given by $$U_{cpu,total} \leftarrow U_{cpu,kernel} + U_{cpu,userland}$$

Considering a set of workload classes R, for workload classes $r \in R$ supported by a preventive/security SOA security apparatus, the fraction of the total CPU utilization contributing to a class $r \in R$ running within a user land may yield the CPU utilization of a class $r \in R$.

$$U_{cpu,r} \leftarrow U_{cpu,total} * \alpha_{userland,r}$$

where the fraction of CPU utilization that can be allocated to the class r E R is given by $$\alpha_{userland,r} \leftarrow \frac{(T_{cpu,r})}{\left(\sum_{i \in R} T_{cpu,i}\right)}$$

given the percentage of transactions for the class r E R among all workload class transactions.

Processing next continues to block 508, where the kernel is incorporated into the model. An operational Service Demand Law for the model may be expressed as:

$$D_{cpu,r} \leftarrow \frac{((U_{cpu,kernel} + U_{cpu,userland}) * \alpha_{userland,r})}{(X_{0,r})}$$

In such a way, the kernel's impact on the service time can be incorporated into the model via a service demand calculations.

At block 510, scheduling impacts of the CPU utilization may also be used as a parameter for a CPU. The above equations for the open class model may also be adapted with a fixed priority scheduling environment parameter.

In one embodiment, operational methods for simulating a CPU may be enhanced by addressing resource partitioning, isolation, virtualization, or the like. Specifically, the parameters for a CPU may be a non-priority based scheduling such as share based fair sharing CPU utilization. The CPU utilization of the class $r \in R$ hosted within a zone partition and associated with a project for running preventive/security processes can be expressed as $$U_{cpu,r} \leftarrow U_{cpu,total} * \alpha_{zone,r} * \beta_{project,r}$$

Hence, the service demand may be expressed as:

$$D_{cpu,r} \leftarrow \frac{(U_{cpu,total} * \alpha_{zone,r} * \beta_{project,r})}{(X_{0,r})}$$

In one embodiment, the demand for the CPU, user land, kernel, or the like may be simulated using a variety of mathematical models, including Neural Network models, programmatic models, Markov models, probabilistic methods, or the like.

At block 512, CPU parameters including processor utilization and service demands may be augmented with parameters for parallelism and locality. At the user land, application listener threads may be mapped to the number of hardware execution threads to take advantage of parallelism for improving performance. For example, with a T2000 server, instruction level, thread level and data level parallelism may be achieved at both system and application level. In addition, the user land processes tend to reuse the data and instructions based on the most recent assesses. Hence a ratio of performance improvement $\gamma$ may be used:

$$U_{cpu,r} \leftarrow U_{cpu,total} * \alpha_{zone,r} * \beta_{project,r} * \gamma$$

$$D_{cpu,r} \leftarrow \frac{(U_{cpu,total} * \alpha_{zone,r} * \beta_{project,r} * \gamma)}{(X_{0,r})}$$

Processing then continues to a calling process for further processing.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Experimental Results

In one example of an experiment of one embodiment of the present invention, conventional K means cluster analysis was conducted for parametric classification to divide workload into natural groups. With 44 sets of data collection, workload was derived per classification of data collected. Four workload classes may be categorized according to different payload sizes. Each class may be associated with one of the clusters identified. A typical 1 KB Payload Size Workload is as follows:

| Classification | Throughput | CPU Utilization | Response Time |
| --- | --- | --- | --- |
| SOA Forwarding | 5402 | 66% | 10 |
| SOA Transformation | 4920 | 68% | 12 |
| SOA Encryption | 1601 | 70% | 70 |
| SOA Signing | 128 | 73% | 900 |

In the experiment, the simulation experienced network I/O bottleneck resulting in 10-1000 ms of processing latency. The CPU historical activities showed low processor run queue size and latency time indicating high CPU waiting time for kernel runnable threads without processor saturation during the measurement. An interrupt was directed to a specific processor to impact current execution flow and force the processor to run the interrupt handler. Most of the interrupts were generated by inbound packets to take CPU processing cycles. During a 3 second sampling interval, 5376 interrupts took less than 17.2% processor time. No bottlenecks were discovered from interrupts to processor binding, interrupt rates and time cost to handling interrupts. Since the interrupts were asynchronous dispatched threads, the apparatus designed on Solaris10™ resolved the scaling limitations without full context switches as the processors were executing instructions. The swap queue size was reported as zero which indicates that no memory shortage occurred. Inbound network packets led to mutex blocking and synchronization. Mutex locks and Read/Write locks were identified with the blocking of the stream I/O. Spin locks at the user land such as lwp_cond_wait, were discovered because of current implementation of blocking network I/O stream processing at the user land. The blocking system calls the performing network I/O resulted in relatively high voluntary context switches. Similar to other user land processes, libnet.so initiated socket stream owns the user land processor locks. In addition, the load average was far less than the CPU count which indicates that little to no system saturation occurred with the workload density.

Service demands and response time for each class of workload were computed, in accordance with the present invention, from the model (e.g., model 200 of FIG. 2) and it was concluded that the apparatus implementation on a T2000 server (e.g., SOA apparatus) was a network bound computation in general. Hence, a class of multi-threaded, loadable, clonable, GLD-based STREAMS Gigabit Ethernet drivers may be recommended for high throughput network I/O. The drivers support the Data Link Provider Interface over the family of Gigabit controllers and multiple Gigabit controllers installed within a system. In addition, multiple network interfaces and various ports of the same interface may improve the throughput.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A method for simulating a security apparatus within a service oriented architecture (SOA), comprising:
    gathering performance data for the SOA;
    generating, based on the performance data, a first queuing performance model to model resource usage by at least one user of the SOA;
    generating, based on the performance data, a second queuing performance model to model a kernel of the SOA;
    generating, based on the performance data, a third queuing performance model for a Central Processing Unit (CPU) of the SOA; and
    generating a Queuing Network model by interconnecting the first queuing performance model, the second queuing performance model, and the third queuing performance model,
    wherein the Queuing Network model simulates the security apparatus within the SOA.

2. The method of claim 1, further comprising:
    performing an incremental online training of the first, second, and third queuing performance models.

3. The method of claim 1, wherein generating the first queuing performance model comprises:
    simulating a plurality of input packets, an arrival rate, and a schedule of use of the at least one user of the SOA.

4. The method of claim 1, wherein generating the first, second, and third queuing performance models is further based on a Quality of Service (QoS) factor.

5. The method of claim 1, wherein generating the second queuing performance model comprises:
    simulating a memory usage, a schedule, a policy of use, and a CPU allocation of the kernel.

6. The method of claim 1, wherein the security apparatus is configured to perform at least one selected from a group comprising encrypting, decrypting, forwarding, transforming, signing, and enforcing a policy.

7. The method of claim 1, wherein an output of at least one of the first, second, and third queuing performance models is an input to at least another one of the first, second, and third queuing performance models.

8. The method of claim 1, wherein, within the Queuing Network model, the first, second, and third queuing performance models are interconnected in a recurrent network.

9. The method of claim 1, wherein generating the third queuing performance model comprises:
    simulating an instruction set, an execution request, and an allocated percentage of CPU usage for an application executing on the CPU.

10. An apparatus for simulating a security apparatus within a service oriented architecture (SOA), comprising:
    an interface for receiving performance data for; and
    a processor configured to perform operations comprising:
        generating, based on the performance data, a first queuing performance model to model resource usage by at least one user of the SOA;
        generating, based on the performance data, a second queuing performance model to model a kernel of the SOA;
        generating, based on the performance data, a third queuing performance model for a Central Processing Unit (CPU) of the SOA; and
        generating a Queuing Network model by interconnecting the first queuing performance model, the second queuing performance model, and the third queuing performance model,
        wherein the Queuing Network model simulates the security apparatus within the SOA.

11. The apparatus of claim 10, further comprising:
    incrementally training the first, second, and third queuing performance models based on the performance data.

12. The apparatus of claim 10, wherein generating the first queuing performance model comprises:
    simulating a plurality of input packets, an arrival rate, and a schedule of use of the at least one user of the SOA.

13. The apparatus of claim 10, wherein the processor is further configured to perform:
    training a neural network on a training set of inputs and outputs for the Queuing Network model.

14. The apparatus of claim 10, wherein generating the second queuing performance model comprises:
    simulating a memory usage, a schedule, a policy of use, and a CPU allocation of the kernel.

15. The apparatus of claim 10, wherein the security apparatus is configured to perform at least one selected from a group comprising encrypting, decrypting, forwarding, transforming, signing, and enforcing a policy.

16. The apparatus of claim 10, wherein an output of at least one of the first, second, and third queuing performance models is an input to at least another one of the first, second, and third queuing performance models.

17. A processor readable medium for simulating a security apparatus within a service oriented architecture (SOA), comprising instructions when executed by a processor performs operations comprising:
    gathering performance data for the SOA;
    generating, based on the performance data, a first queuing performance model to model resource usage by at least one user of the SOA;
    generating, based on the performance data, a second queuing performance model to model a kernel of the SOA;
    generating, based on the performance data, a third queuing performance model for a Central Processing Unit (CPU) of the SOA; and
    generating a Queuing Network model by interconnecting the first queuing performance model, the second queuing performance model, and the third queuing performance model,
    wherein the Queuing Network model simulates the security apparatus within the SOA.

18. The processor readable medium of claim 17, wherein generating the first, second, and third queuing performance models is further based on a Quality of Service (QoS) factor.

19. The processor readable medium of claim 17, wherein generating the first, second, and third queuing performance models is further based on a probability distribution function of the states of the SOA.

* * * * *

UNITED STATES PATENT AND TRADEMARK OFFICE
CERTIFICATE OF CORRECTION

PATENT NO. : 8,886,779 B2  
APPLICATION NO. : 11/875628  
DATED : November 11, 2014  
INVENTOR(S) : Liu Page 1 of 1

It is certified that error appears in the above-identified patent and that said Letters Patent is hereby corrected as shown below:

In the Specification

In column 4, line 36, delete "Solaris 10™" and insert -- Solaris10™ --, therefor.

In column 4, line 37, delete "Solaris 10™" and insert -- Solaris10™ --, therefor.

In column 7, line 10, delete "an a" and insert -- a --, therefor.

In column 8, line 53, delete "de" and insert -- be --, therefor.

In column 11, line 20, delete "a an" and insert -- an --, therefor.

In the Claims

In column 15, line 63, in Claim 10, delete "for;" and insert -- for the SOA; --, therefor.

Signed and Sealed this  
Twenty-third Day of June, 2015

Michelle K. Lee  
*Director of the United States Patent and Trademark Office*